(12) United States Patent
Yamamoto et al.

(10) Patent No.: US 6,999,398 B2
(45) Date of Patent: Feb. 14, 2006

(54) METHOD AND APPARATUS FOR RECORDING INFORMATION ON INFORMATION RECORDING MEDIUM

(75) Inventors: Masakuni Yamamoto, Kanagawa (JP); Yasushi Hozumi, Saitama (JP); Yasumori Hino, Nara (JP)

(73) Assignees: Canon Kabushiki Kaisha, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 735 days.

(21) Appl. No.: 10/106,110

(22) Filed: Mar. 27, 2002

(65) Prior Publication Data
US 2002/0150023 A1 Oct. 17, 2002

(30) Foreign Application Priority Data
Mar. 30, 2001 (JP) .............................. 2001-101178

(51) Int. Cl.
G11B 7/45 (2006.01)
G11B 7/24 (2006.01)

(52) U.S. Cl. ................. 369/111; 369/13.55; 369/275.3; 369/275.4

(58) Field of Classification Search ............. 369/13.55, 369/111, 275.3
See application file for complete search history.

(56) References Cited

U.S. PATENT DOCUMENTS

| | | | |
|---|---|---|---|
| 5,051,974 A | 9/1991 | Taniguchi et al. | 369/44.12 |
| 5,297,128 A | 3/1994 | Yamaguchi et al. | 369/116 |
| 5,333,125 A | 7/1994 | Yamamoto | 369/44.34 |
| 5,365,535 A | 11/1994 | Yamaguchi et al. | 372/38 |
| 5,774,439 A * | 6/1998 | Aoki et al. | 369/53.29 |
| 6,018,507 A * | 1/2000 | Takeda et al. | 369/111 |
| 6,027,825 A | 2/2000 | Shiratori et al. | 428/694 |
| 6,046,969 A * | 4/2000 | Towner et al. | 369/47.31 |
| 6,249,489 B1 * | 6/2001 | Fujii et al. | 369/13.54 |
| 6,352,765 B1 * | 3/2002 | Iwata et al. | 428/332 |
| 6,570,826 B2 * | 5/2003 | Hosokawa | 369/13.55 |
| 6,600,711 B1 * | 7/2003 | Hasegawa | 369/109.02 |
| 6,731,589 B2 * | 5/2004 | Sakamoto et al. | 369/275.4 |
| 6,865,146 B2 * | 3/2005 | Kojima | 369/53.29 |
| 2002/0136124 A1 * | 9/2002 | Pirot et al. | 369/47.54 |
| 2003/0147338 A1 * | 8/2003 | Yoshikawa et al. | 369/275.3 |
| 2004/0090897 A1 * | 5/2004 | Akiyama et al. | 369/59.25 |

FOREIGN PATENT DOCUMENTS

JP 6-290496 10/1994

* cited by examiner

*Primary Examiner*—David Hudspeth
*Assistant Examiner*—Adam R. Giesy
(74) *Attorney, Agent, or Firm*—Fitzpatrick, Cella, Harper & Scinto

(57) ABSTRACT

Information is recorded on an information recording medium such as a magneto-optical recording medium, having two recording tracks arranged alternately, typically in a double spiral manner. The two recording tracks have different recording characteristics and information is firstly recorded on the recording track less liable to cross write, typically on a land section, and subsequently on the recording track more liable to cross write, typically on a groove section.

7 Claims, 6 Drawing Sheets

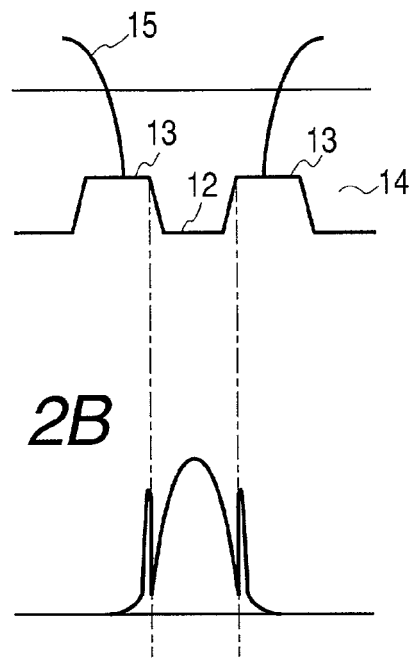
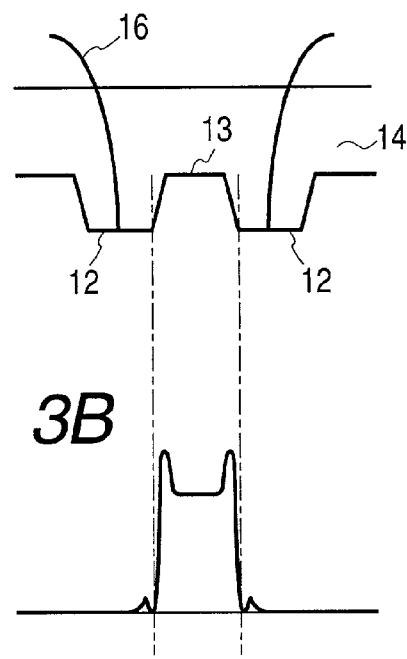
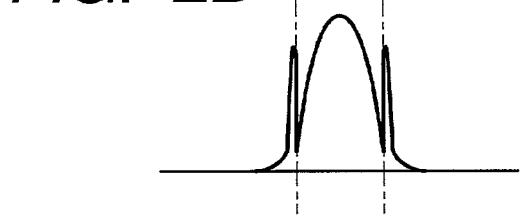
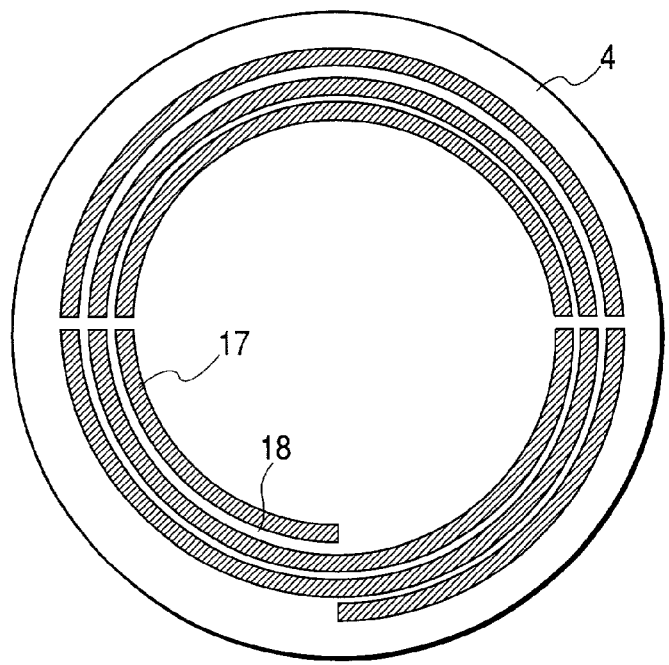

METHOD AND APPARATUS FOR RECORDING INFORMATION ON INFORMATION RECORDING MEDIUM

BACKGROUND OF THE INVENTION

1. Field of the Invention

This invention relates to a method and an apparatus for recording information on an information recording medium having information recording tracks with different recording characteristics that are arranged alternately.

2. Related Background Art

In recent years, information mediums to be used for recording information thereon and reproducing information therefrom by means of a small light spot have been attracting attention. Research and development efforts have been made to improve the recording density of such information recording mediums.

Two types are known to date for such information recording mediums. One is a write-once type that utilizes a metal thin film or a coloring matter-based recording material as write-once recording medium and the other is a rewritable type that utilizes a magneto-optical material or a phase change material as rewritable recording medium.

FIG. 6 of the accompanying drawings schematically illustrates an optical head of a known magneto-optical information recording/reproducing apparatus.

Referring to FIG. 6, the optical head comprises a semiconductor laser 36, a collimator lens 37, a beam-shaping prism 38, a polarization beam splitter 39, an objective lens 40, a magneto-optical disk 41, a magnetic head 42, a polarization beam splitter 43, a half-wave plate 44, a condenser lens 45, a polarization beam splitter 46, photo detectors 47, 48, a condenser lens 49, a half prism 50, a photo detector 51, a knife edge 52 and a photo detector 53.

The semiconductor laser 36 operates as a light source. The divergent flux of light emitted from the semiconductor laser 36 is collimated by the collimator lens 37 and modified to a collimated flux of light having a circular cross-section by the beam-shaping prism 38. The two linearly polarized components of light that rectangularly intersect each other are referred to as p-polarized light and s-polarized light. Assume that the collimated flux of light is linearly p-polarized light (polarized in parallel with the surface of FIG. 6).

The flux of p-polarized light is made to enter the polarization beam splitter 39. The polarization beam splitter 39 typically shows a transmittance of 60% and a reflectance of 40% to p-polarized light and a transmittance of 0% and a reflectance of 100% to s-polarized light.

The flux of p-polarized light transmitted through the polarization beam splitter 39 is converged by the objective lens 40 and irradiated onto the magnetic layer of the magneto-optical disk 41 to form a very small light spot.

An external magnetic field is applied to the area irradiated by the flux of light on the magnetic layer from the magnetic head 42 and a magnetic domain (mark) is recorded there.

The flux of light reflected by the magneto-optical disk 41 is returned to the polarization beam splitter 39 by way of the objective lens 40. Then, part of the reflected light is separated from the rest by the polarization beam splitter 39 and brought to the reproduction optical system of the apparatus.

In the reproduction optical system, the separated flux of light is further split by the polarization beam splitter 43 into two fluxes of light. The polarization beam splitter 43 is characterized by typically having a transmittance of 20% and a reflectance of 80% to p-polarized light and a transmittance of 0% and a reflectance of 100% to s-polarized light.

One of the fluxes of light separated by the polarization beam splitter 43 is led to the half prism 50 by way of the condenser lens 49.

The flux of light led to the half prism 50 is further split into two fluxes of light, one of which is led to the photo detector 51 and the other is led to the photo detector 53 by way of the knife edge 52. Then, they are used to generate an error signal to be used for auto-tracking and auto-focusing the light spot by means of a control optical system (not shown).

The other flux of light produced by the polarization beam splitter 43 is further split into two fluxes of light by the polarization beam splitter 46 by way of the half-wave plate 44 that turns the direction of polarization of the flux of light by 45° and the condenser lens 45 for converging the flux of light. One of the fluxes of light separated by the polarization beam splitter 46 is led to the photo detector 47 while the other is led to the photo detector 48. The polarization beam splitter 46 is characterized by typically having a transmittance of 100% and a reflectance of 0% to p-polarized light and a transmittance of 0% and a reflectance of 100% to s-polarized light.

A signal is reproduced by detecting the differential of the output signals of the photo detectors 47, 48 by means of a differential amplifier (not shown).

Meanwhile, it is well known that information can be recorded on a medium using a magneto-optical material (magneto-optical medium) by utilizing the directional difference of vertical magnetization. As a linearly polarized flux of light is irradiated onto the magneto-optical medium on which information is recorded by utilizing the directional difference of magnetization, the direction of polarization of the reflected flux of light turns clockwise or counterclockwise depending on the direction of magnetization.

FIG. 7 of the accompanying drawings illustrates the principle of reproducing a magneto-optical signal. Referring to FIG. 7, assume that the direction of polarization of the linearly polarized flux of light striking the magneto-optical recording medium agrees with the coordinate axis P and the direction of the reflected flux of light is indicated by R+ that is rotated from the coordinate axis P by +θk for downward magnetization and by R− that is rotated from the coordinate axis P by −θk for upward magnetization. When an analyzer is placed in the direction shown in FIG. 7, the flux of light transmitted through the analyzer is oriented in the direction of A for R+ and in the direction of B for R−. Thus, the recorded information can be reproduced as difference of light intensity by detecting these fluxes of light by means of a photo detector.

In the arrangement of FIG. 6, the polarization beam splitter 46 operates as an analyzer. More specifically, the polarization beam splitter 46 operates as the analyzer for the direction of +45° from the P axis for one of the separated fluxes of light and for the direction of −45° from the P axis for the other flux of light. In other words, the signal components obtained by the photo detectors 47 and 48 have phases inverted relative to each other. Therefore, it is possible to obtain a reproduced signal with reduced noise by detecting the differential of the signals. In recent years, the demand for magneto-optical recording mediums capable of recording information with a high recording density has been increasing.

Generally, the recording density of an optical disk such as magneto-optical recording medium depends on the wavelength of the laser beam of the reproduction optical system and the NA (numerical aperture) of the objective lens. In other words, when the wavelength λ of the laser beam of the reproduction optical system and the NA of the objective lens are given, the diameter of the light spot is determined. Then, the lower limit of the size of magnetic domain that can be used for signal reproduction is automatically defined to be about λ/2NA. Therefore, either the wavelength of the laser beam of the reproduction optical system has to be reduced or the NA of the objective lens of the system has to be increased for realizing high density recording with known optical disks.

However, there is a limit to both the reduction of the wavelength of the laser beam and the increase of the NA. Thus, technologies for improving the recording density by devising a novel structure for a recording medium and a new method of reading signals from a recording medium have been developed.

Techniques for improving the recording density of a magneto-optical disk can be roughly divided into two groups. One includes techniques for improving the linear density and the other includes those for improving the track density.

Brush-tip recording is a technique of recording information by using a high temperature area of a light spot and can be used to improve the linear density. With another technique for improving the linear density, magnetic modulation recording and a super-resolution medium are combinedly used on the basis of a magneto-optical material.

For example, the applicant of the present patent application proposed a signal reproducing method in Japanese Patent Application Laid-Open No. 6-290496. With the proposed method, a light spot is made to scan a track on a magneto-optical medium formed by laying a plurality of magnetic layers to produce a multilayer structure. As a result of the scanning operation, a magnetic domain (mark) recorded on the first magnetic layer by vertical magnetization is transferred to the third magnetic layer arranged close to the first magnetic layer with the second magnetic layer for controlling the exchange coupling force that is interposed between them and then the domain wall of the magnetic domain transferred to the third magnetic layer is displaced to enlarge the magnetic domain relative to the original magnetic domain recorded on the first magnetic layer before retrieving the reproduced signal.

The domain wall displacement method disclosed in Japanese Patent Application Laid-Open No. 6-290496 for signal reproduction will be described below by referring to FIGS. 8A through 8D, 9 and 10.

FIGS. 8A through 8D schematically illustrate the domain wall displacement method for signal reproduction. FIG. 8A is a cross-sectional view of the magnetic layers and FIG. 8B is a plan view as viewed from the side where a light spot comes to strike the magnetic layers.

Referring to FIGS. 8A and 8B, the magneto-optical disk 54, or the magneto-optical medium, comprises the first magnetic layer 55, the second magnetic layer 56 and the third magnetic layer 57.

The first magnetic layer 55 is used to record information as magnetic domains (to be referred to as memory layer hereinafter).

The second magnetic layer 56 is used to control the exchange coupling force between the first magnetic layer 55 and the third magnetic layer 57 (to be referred to as control layer hereinafter).

The third magnetic layer 57 is a layer to which a magnetic domain recorded on the memory layer 55 is transferred by utilizing the distribution of heat produced by the operation of the control layer 56 and that of the light spot (to be referred to as readout layer hereinafter). The third magnetic layer 57 is also used to make the transferred magnetic domain larger than the original magnetic domain recorded on the memory layer 55 by displacing the domain wall of the transferred magnetic domain. In FIG. 8A, the arrows in the memory layer 55, the control layer 56 and the readout layer 57 indicate the directions of atomic spins.

Reproduction light spot 58 is used to reproduce signals from the magneto-optical disk 54. A signal is to be reproduced from track 59 on the magneto-optical disk 54. Domain walls 60 are formed along the boundaries of oppositely directed spins. Domain wall 61 is that of the magnetic domain transferred onto the readout layer 57, which is to be displaced.

FIG. 8C is a graph illustrating the temperature distribution of the magneto-optical disk 54.

Theoretically, a domain wall can be displaced for signal reproduction by using a single light spot or two light spots. However, it is assumed here that two light spots are used for the purpose of simplifying the explanation. In FIGS. 8A and 8B, only the light spot that actually works for signal reproduction is shown. The other slight spot (not shown) is irradiated to produce the temperature distribution illustrated in FIG. 8C.

The temperature on the magneto-optical disk 54 at position Xs is Ts that is close to the Curie temperature of the control layer 56 as shown in FIG. 8C. The shaded area in FIG. 8A is the area where the temperature on the magneto-optical disk 54 is higher than the Curie temperature.

FIG. 8D is a graph illustrating the distribution of domain wall energy density σ1 of the readout layer 57 that corresponds to the temperature distribution of FIG. 8C and the force F1 acting on the domain walls of the layers. As shown in FIG. 8D, when the domain wall energy density σ1 shows a gradient in the X-direction, the force F1 illustrated in FIG. 8D acts on the domain walls of the layers located at position X. More specifically, the force F1 acts to displace the domain walls so as to reduce the domain wall energy.

Since the domain wall coercivity is small while the domain wall mobility is large in the readout layer 57, domain walls can be displaced easily and independently by the force F1. However, in the region located behind the position Xs (and at the right side in FIG. 8A), the domain walls in the readout layer 57 are fixed at the respective positions that correspond to the positions of their counterparts in the memory layer 55 by the exchange coupling between the readout layer 57 and the memory layer 55 that shows a large domain wall coercivity.

Now assume that the domain wall 61 is located at position Xs and the temperature of the magneto-optical disk 54 is raised to Ts that is close to the Curie temperature of the control layer 56 so that the exchange coupling between the readout layer 57 and the memory layer 55 is broken.

As a result, the domain wall 61 in the readout layer 57 instantaneously moves along arrow B to a position where the temperature is higher and the domain wall energy density is smaller. Then, as the reproduction light spot 58 passes, all the atomic spins of the readout layer 57 in the light spot are oriented to a same direction as shown in FIG. 8B. As the medium is moved, the domain wall 61 (or the domain walls 60 or so) is also moved instantaneously and all the atomic spins in the light spot are inverted and oriented to a same direction.

The flux of light reflected by the magneto-optical disk 54 is detected by an optical head of any conventional type as shown in FIG. 6 for a differential to reproduce a signal.

With this domain wall displacement method for signal reproduction, the signals reproduced by a light spot always show a constant amplitude regardless of the size of magnetic domain in the memory layer 55 and hence are free from the problem of waveform interference attributable to the optical diffraction limit. In other words, with the domain wall displacement method, it is possible to reproduce a magnetic domain that is smaller than the limit of resolution defined by the laser wavelength λ and the NA of the objective lens as λ/2NA so that a linear density of a magnitude of sub-microns can be handled for signal reproduction.

FIG. 9 of the accompanying drawings schematically illustrates the optical system of an optical head using two light spots.

Referring to FIG. 9, the optical head comprises semiconductor lasers 63, 64, collimator lenses 65, 66, a dichroic mirror 67, a polarization beam splitter 68 and an objective lens 69. A recording medium 70 is also shown in FIG. 9.

The semiconductor laser 63 is adapted to be used for signal recording/reproduction. For example, it is adapted to emit a laser beam with a wavelength of 780 nm.

The semiconductor laser 64 is adapted to be used for heating. For example, it is adapted to emit a laser beam with a wavelength of 1.3 μm.

The semiconductor lasers 63, 64 are arranged at respective positions where they emit laser beams that strike the recording medium as p-polarized light.

The divergent laser beams emitted from the semiconductor lasers 63 and 64 are shaped by appropriate beam shaping means to show a substantially circular cross-section and subsequently collimated respectively by the collimator lenses 65, 66.

The dichroic mirror 67 transmits the 780 nm laser beam, by 100% and reflects the 1.3 μm laser beam by 100%.

The polarization beam splitter 68 transmits p-polarized light by 70 to 80% and reflects s-polarized light that is polarized perpendicularly relative to p-polarized light by about 100%.

The collimated fluxes of light coming respectively from the collimator lenses 65 and 66 are made to enter the objective lens 69 by way of the dichroic mirror 67 and the polarization beam splitter 68. Note that the flux of 780 nm is made to have a large diameter relative to the aperture of the objective lens 69, whereas the flux of light of 1.3 μm is made to show a small diameter relative to the aperture of the objective lens 69. Therefore, the NA of the objective lens 69 has little effect on the flux of light of 1.3 μm and hence the diameter of the flux of light of 1.3 μm is larger than that of the flux of light of 780 nm on the recording medium 70.

The flux of light reflected by the recording medium 70 is collimated after passing through the objective lens 69 once again and reflected by the polarization beam splitter 68 to become flux of light 71. The flux of light 71 is subjected to operations including wavelength isolation conducted by an optical system (not shown) to obtain a servo error signal and a reproduced information signal by using a conventional method.

FIGS. 10A and 10B of the accompanying drawings illustrate the relationship between the light spot for signal recording/reproduction and the heating light spot on the recording medium.

Referring to FIG. 10A, light spot 72 is the one having a wavelength of 780 nm and adapted to be used for signal recording/reproduction, whereas light spot 73 is the one having a wavelength of 1.3 μm and adapted to be used for heating.

Also referring to FIG. 10A, domain wall 74 is that of the magnetic domain recorded on a land 75 and region 77 is the region whose temperature is raised by the heating light spot 73.

The light spot 72 for signal recording/reproduction and the heating light spot 73 are coupled on the land 75 between two grooves 76. As a result, a temperature gradient can be produced on the moving recording medium in a manner as shown in FIG. 10B. The temperature gradient and the light spot for signal recording/reproduction show a relationship as illustrated in FIGS. 8A through 8D. With this arrangement, the domain wall can be displaced for signal reproduction.

Meanwhile, a technique referred to as land and groove recording is known for improving the track density. Contrary to the conventional technique of recording information only on the land section of a magneto-optical disk, the land and groove technique utilizes the areas of the recording medium that have hitherto been used as tracking guide grooves (groove section) in order to improve the efficiency of information recording and also the track density.

However, the track pitch of DVDs adapted to land and groove recording is normally about λ/(1.8·NA) and the efforts for reducing the track pitch have been baffled because of cross write and other problems.

When recording information on an intended information track, it can be recorded erroneously on one or more than one adjacent track. This is a phenomenon referred to as cross write that baffles efforts for improving the recording density. Furthermore, with the domain wall displacement method for signal reproduction, magnetic domains (marks) that correspond to information need to be recorded to fully exploit the width of the tracks if compared with other methods. Therefore, the problem of cross write becomes more serious when it is combined with the land and groove recording method.

SUMMARY OF THE INVENTION

In view of the above identified circumstances, it is therefore the object of the present invention to reduce the problem of cross write and raise the track density in an information recording method or apparatus for recording information on an information recording medium having information recording tracks with different recording characteristics that are arranged alternately.

According to the invention, the above object is achieved by providing a method for recording information on an information recording medium having information recording tracks with different recording characteristics, said tracks being arranged alternately, said method comprising:

a step of recording information on an information track less liable to cross write; and a step of recording information on an information track more liable to cross write.

BRIEF DESCRIPTION OF THE DRAWINGS

FIGS. 2A and 2B are a schematic radial cross-sectional view of a part of an optical disk where a land section is irradiated with a light spot and a heat distribution thereof.

FIGS. 3A and 3B are a schematic radial cross-sectional view of a part on optical disk where a groove section is irradiated with a light spot and a heat distribution thereof.

FIG. 4 is a schematic plan view of an optical disk.

DESCRIPTION OF THE PREFERRED EMBODIMENTS

Now, the present invention will be described by referring to the accompanying drawings that illustrate a preferred embodiment of the invention.

Figure 1:
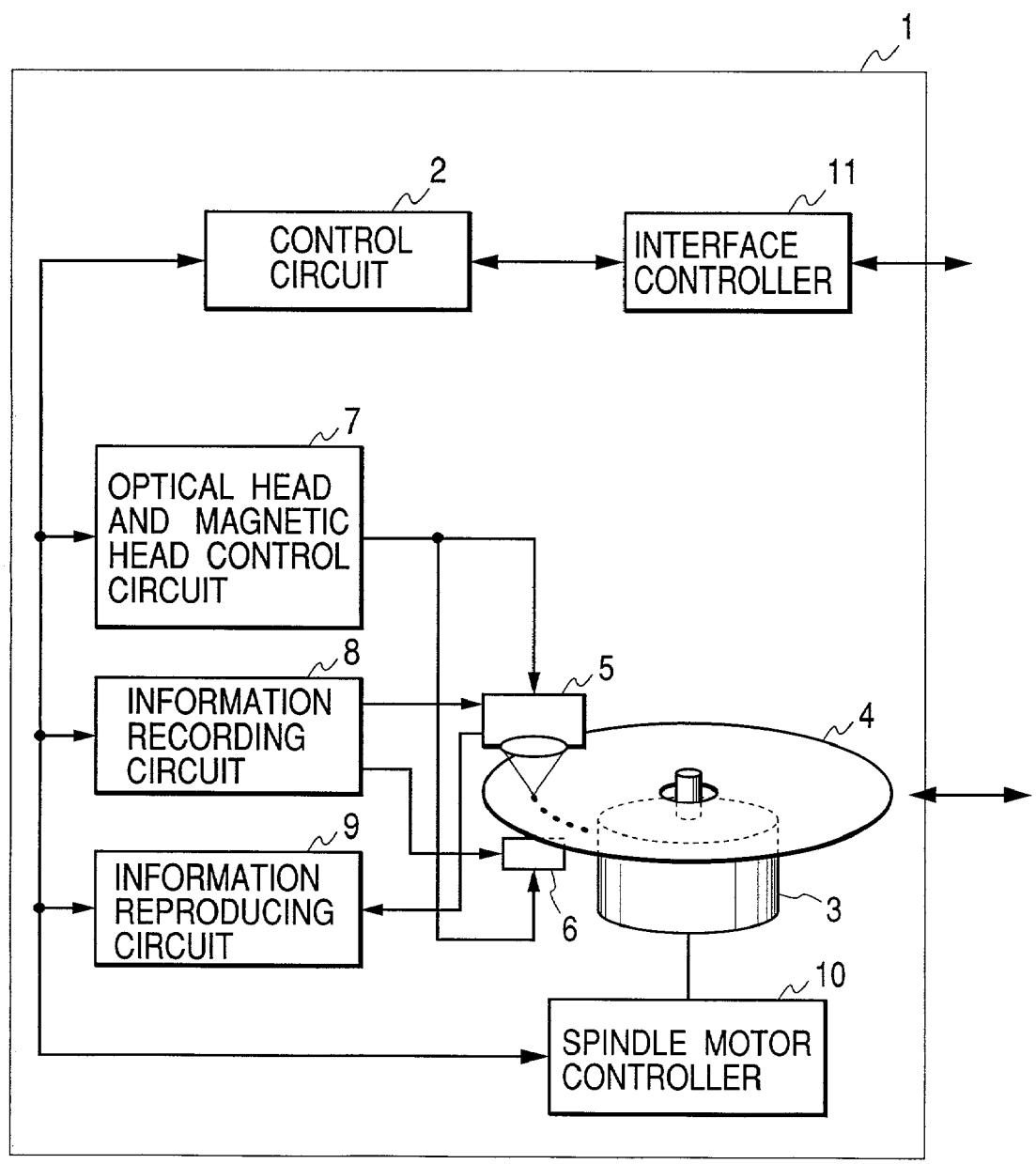
FIG. 1 is a schematic block diagram of an embodiment of optical information recording/reproducing apparatus according to the invention.

FIG. 1 is a schematic block diagram of an embodiment of optical information recording/reproducing apparatus according to the invention.

Referring to FIG. 1, the optical information recording/reproducing apparatus 1 comprises a control circuit 2, a spindle motor 3, a magneto-optical disk 4, an optical head 5, a magnetic head, an optical head and magnetic head control circuit 7, an information recording circuit 8, an information reproducing circuit 9, a spindle motor controller 10 and an interface controller 11.

The control circuit 2 controls transmission and reception of information between the optical information recording/reproducing apparatus 1 and an external information processing apparatus such as a computer and also controls the operation of recording information on and reproducing information from a magneto-optical disk as well as that of other functional components.

The spindle motor 3 drives the magneto-optical disk 4 under the control of the spindle motor controller 10.

The magneto-optical disk 4 is an information recording medium adapted to be inserted into and ejected from the information recording/reproducing apparatus 1 by means of a mechanism (not shown).

Figure 6:
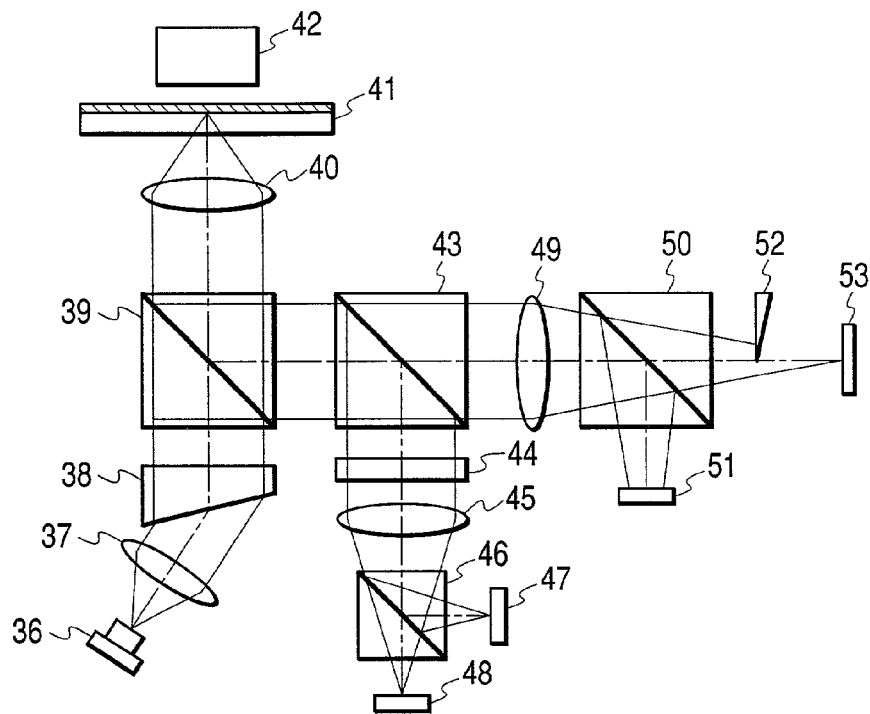
FIG. 6 is a schematic illustration of the operation system of the optical head of a known magneto-optical information recording/reproducing apparatus.
Figure 7:
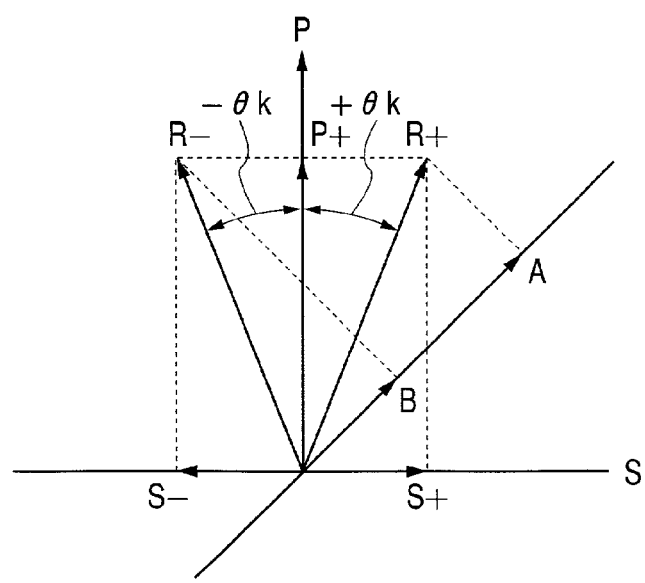
FIG. 7 is a schematic illustration of the principle of reproducing a magneto-optical signal.

The optical head 5 optically records information on and reproduces information from the magneto-optical disk 4. A one-beam optical head as shown in FIG. 6 may be used for the optical head 5. If, for example, the wavelength of light from the light source is 635 nm and the NA of the objective lens is 0.6, $\lambda/(1.8 \cdot NA)$ shows a value of about 0.59 μm, which conventionally defines the limit of track pitch for magneto-optical disks. However, this invention makes it possible to use a narrower track pitch and hence a higher track density.

The magnetic head 6 is arranged at the side opposite to the optical head 5 from the viewpoint of the magneto-optical disk 4 and adapted to apply a magnetic field for the information recording operation.

The optical head and magnetic head control circuit 7 controls the position of the light spot formed by the optical head 5 and that of the magnetic head 6. The optical head and magnetic head control circuit 7 is responsible for auto tracking control, seek operation control and auto focusing control.

The information recording circuit 8 is adapted to record information while the information reproducing circuit 9 is adapted to reproduce information.

Figure 8A:
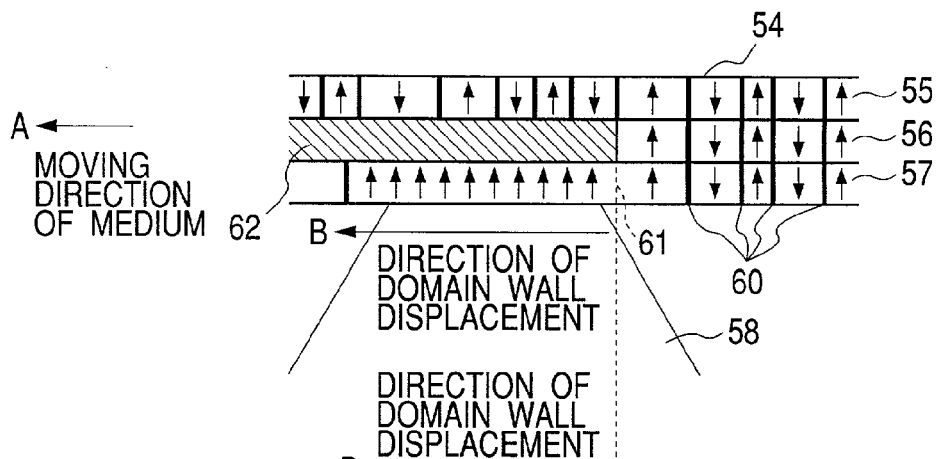
FIGS. 8A, 8B, 8C and 8D are schematic illustrations of the principle of the domain wall displacement method for signal reproduction.
Figure 8B:
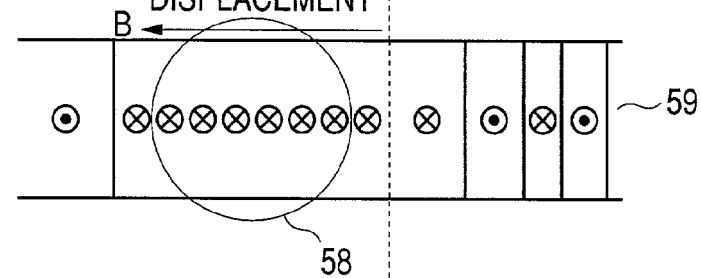
Figure 8C:
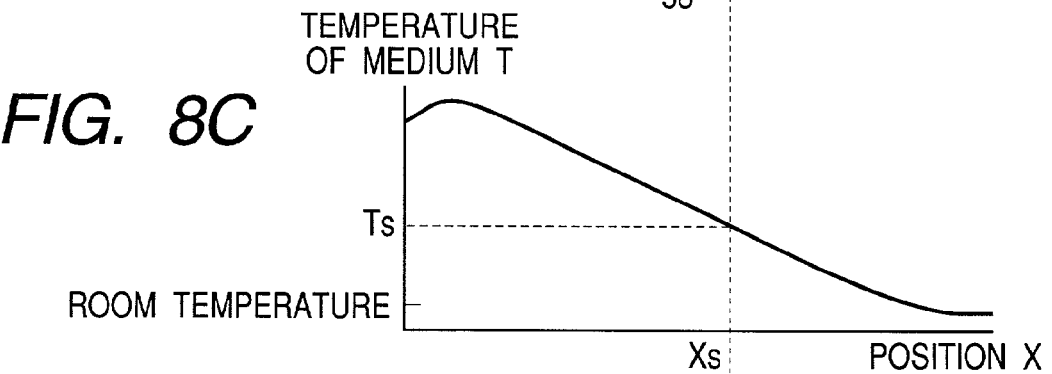
Figure 8D:
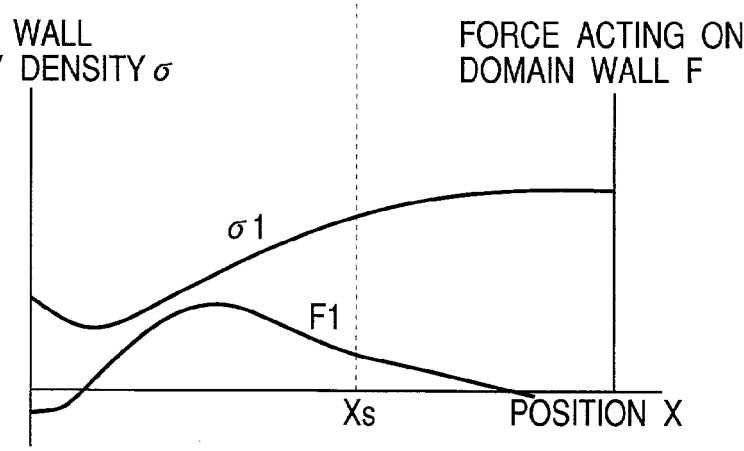
Figure 9:
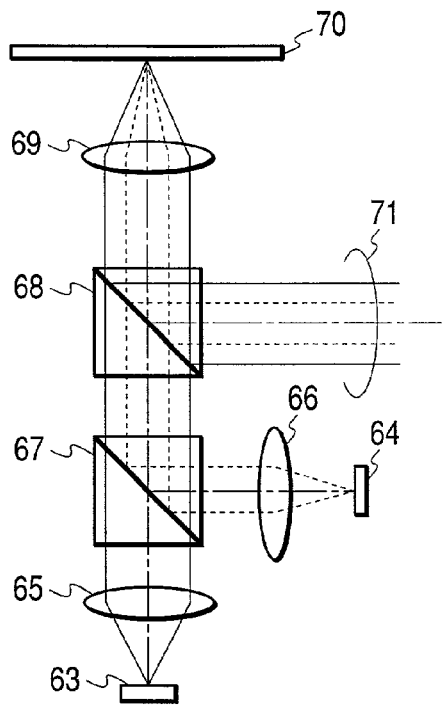
FIG. 9 is a schematic illustration of the optical system of an optical head adapted to use two light spots.
Figure 10A:
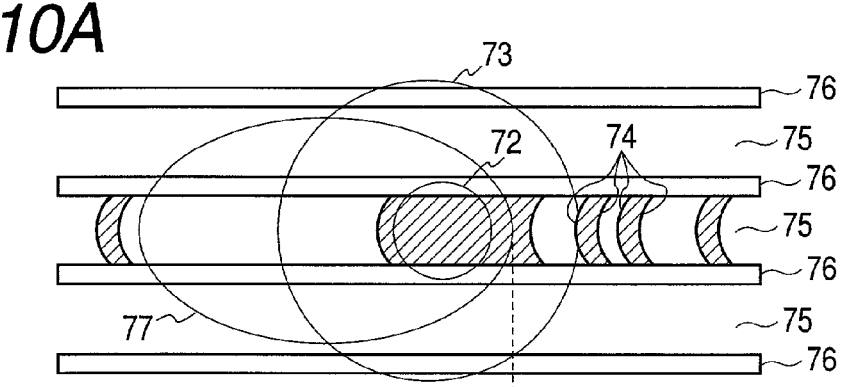
FIGS. 10A and 10B are a schematic illustration of the relationship between a signal recording/reproducing light spot and a heating light spot on a recording medium and a heat distribution thereof.
Figure 10B:
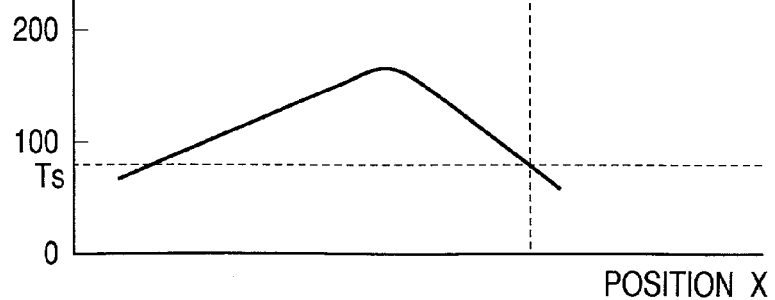

This embodiment is adapted to use a magneto-optical disk 4 same as the one shown in FIG. 8A. Therefore, a magneto-optical disk 4 to be used with the embodiment comprises at least three magnetic layers including a memory layer (first magnetic layer), a control layer (second magnetic layer) and a readout layer (third magnetic layer). It functions just like the one described above by referring to the conventional technology. In other words, the memory layer stores information in the form of magnetic domains and the control layer regulates the exchange coupling force between the memory layer and the readout layer, while the readout layer is used to transfer one of the magnetic domains stored in the memory layer at a time, utilizing the function of the control layer and the heat distribution produced by a light spot. As pointed out above, the transferred magnetic domain is made larger than the original magnetic domain stored in the memory layer by displacing the domain wall of the magnetic domain.

The magnetic layers may be made of an amorphous alloy prepared by combining one or more than one transition metal and one or more than one rare earth metal. Examples of major transition metals include Fe, Co and Ni, whereas those of major rare earth metals include Gd, Tb, Dy, Ho, Nd and Sm. Typical combinations of these that can be used for the purpose of the invention include TbFeCo, GdTbFe, GdFeCo, GdTbFeCo and GdDyFeCo. Cr, Mn, Cu, Ti Al, Si, Pt and/or In may be added to a small extent in order to improve the corrosion resistance of the alloy. Furthermore, a metal layer of Al, AlTa, AlTi, AlCr or Cu may be added to the above listed magnetic layers in order to regulate the thermal characteristics of the magneto-optical disk.

FIGS. 2A and 2B and FIGS. 3A and 3B are schematic radial cross-sectional views of two different parts of an optical disk and a heat distribution thereof.

FIG. 2A shows a land section 12 irradiated by a light spot 15 from the side of the transparent substrate 14 and FIG. 2B shows the heat distribution of the land section 12.

FIG. 3A shows a groove section 13 irradiated by a light spot 16 from the side of the transparent substrate 14 and FIG. 3B shows the heat distribution of the groove section 13.

As seen from FIGS. 2A and 2B, as the land section 12 is irradiated by the light spot 15, a sharp high temperature area is produced along the boundary of the land section 12 and each of the adjacent groove sections 13. The influence of the high temperature area increases to by turn increase the possibility of producing recording error (cross write) in the groove sections 13 as the track density is raised. On the other hand, as the groove section 13 is irradiated by the light spot 16, the high temperature areas are limited to the inside of the groove section 13 and the risk of producing recording error in the adjacent land sections 12 does not increase. These facts are proved by simulations and experiments.

The influence of cross write in the land section and the groove section is mainly dependent on the profile of the substrate and not affected significantly by the type of the recording film. In other words, the recording film shows substantially same characteristics regardless if it is made of a magneto-optical material as described above, a phase change material that is used in DVDs or a material containing a coloring matter.

FIG. 4 is a schematic plan view of an optical disk 4 as viewed from above. It shows land sections 17 and groove sections 18. The land sections 17 and the groove sections 18 of the illustrated optical disk are arranged alternately to form double spirals.

Figure 5:
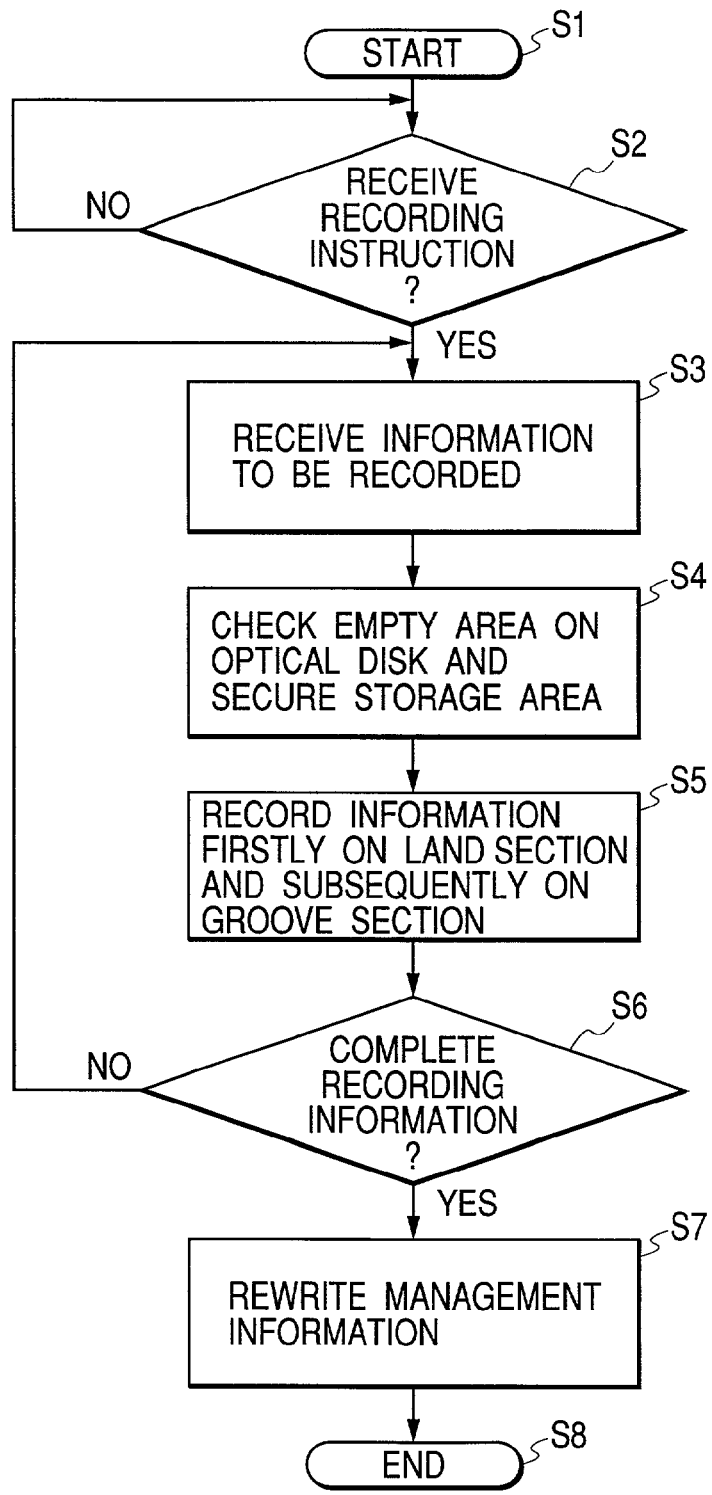
FIG. 5 is a flow chart of an operation of recording information on an optical disk by means of an information recording/reproducing apparatus.

FIG. 5 is a flow chart of an operation of recording information on an optical disk 4 by means of an information recording/reproducing apparatus 1.

Firstly, the information recording/reproducing apparatus 1 starts operation in Step S1.

Then, in Step S2, the information recording/reproducing apparatus 1 waits for a recording instruction.

Upon receiving a recording instruction, the information recording/reproducing apparatus 1 receives the information to be recorded in Step S3.

Thereafter, in Step S4, the information recording/reproducing apparatus 1 checks the empty area on the optical disk and secures a necessary storage area according to the amount of information received in Step S3.

Subsequently, the information recording/reproducing apparatus 1 records the information in the storage area secured for it in Step S4. When doing this, the information recording/reproducing apparatus 1 firstly records the information in the land section where the phenomenon of cross write hardly occurs and, after completing the operation of recording information in the land section, it records the remaining information in the groove section where the problem of cross write can occur more easily.

With this information recording arrangement, a seek action takes place when switching from the land section to the groove section. A large storage area needs to be secured in such a case of recording information on a moving image that involves a large amount of information. Then, the information will have to be recorded by using a considerable number of information tracks and much time has to be spent for seek actions for the purpose of switching from a land section to a groove section and vice versa.

Therefore, when recoding a large amount of information as in the case of information on a moving image, the information recording/reproducing apparatus 1 defines an upper limit of storage capacity to be used in a recording session as a unit and records information on a unit by unit basis, utilizing a buffer memory (not shown) or the like. This arrangement can reduce the time required for seek actions that are necessary for switching operations.

Furthermore, when recording information on a moving image, the information recording/reproducing apparatus 1 performs the information recording operation of Step S5 from the inside toward the outside, or the other way, of the optical disk on a unit by unit basis. Then, the time required for seek actions in the reproducing operation is also reduced.

Thereafter, the information recording/reproducing apparatus 1 proceeds to Step S6, where it determines if the operation of recording the information has completed or not.

If the operation of recording the information has not completed, the information recording/reproducing apparatus 1 returns to Step S3 and continues the information recording operation. If, on the other hand, it is determined in Step S6 that the operation of recording the information has completed, the information recording/reproducing proceeds to Step S7, where it rewrites the management information of the optical disk. Then, the information recording/reproducing apparatus 1 ends the information recording operation in Step S8.

With this embodiment, information is recorded firstly in an information track less liable to cross write and then in an information recording track more liable to cross write. In other words, if information is erroneously recorded in an information track more liable to cross write, correct information is recorded thereover subsequently to minimize the influence of cross write. Therefore, it is possible to raise the track density of the information recording medium.

Since information is recorded firstly in the land section and thereafter in the groove section, this embodiment can most suitably be used for recording a large amount of information sequentially from an end to the other end of a disk. More specifically, information may be recorded in the land section from an end to the other end of a disk and then in the groove section from the original end to the other end. Alternatively, if a disk is divided into zones, information may be recorded in the land section of a zone and then in the groove section of the zone before moving to another zone.

Additionally, with this embodiment, when new information is written over old information, it cannot be written only on the land sections of adjacently located tracks because erroneous recording (cross write) can occur on the groove sections of the adjacently located tracks. In other words, when writing new information over old information in this embodiment, it is always necessary either to record information on a land section and then on the groove section or to rewrite no information on the land section.

In order to avoid complexity of file management at the time of recording information, it may be so controlled by the system that no new information is written in the storage areas of a disk that already store information even if the disk is not of the write-once type but of the rewritable type that is typically made of a magneto-optical material.

Conversely, if a rewritable type disk needs to be used as such, the information track may be divided in a number of small zones so that each zone may coherently store related pieces of information and the information stored in a zone may be erased in such a way that both the land sections and the groove sections that are located side by side are made empty at the same time.

Furthermore, it may be so arranged that, when recording information in a land section, the information already in the groove sections located next to the land section to be used for the recording is read out in advance and stored temporarily in the recording apparatus. The information temporarily moved to the recording apparatus is put back to the original groove sections after rewriting the information on the land section.

While the above embodiment is described in terms of recording information in a land and groove recording mode on an optical disk that is made of a magneto-optical material and whose domain walls are apt to be moved in order to improve the line density, other appropriate optical disks such as disks made of other magneto-optical materials and disks made of some other materials such as a phase change material may equally be used for the purpose of the invention.

It may be needless to say that the present invention is applicable not only to land and groove recording but also to recording information on an optical disk where information tracks are arranged side by side with different recording characteristics.

What is claimed is:

1. A method for recording a series of information on an information recording medium having a recording region comprising information tracks including a land section and a groove section, the land section and the groove section being arranged alternately, said method comprising the step of:

recording the information on the land section and subsequently on the groove section over the whole recording region, or where the recording region is divided into a plurality of zones, over each zone.

2. A method according to claim 1, wherein the information tracks are arranged in a double spiral form.

3. A method according to claim 2, wherein
information is recorded from the inside toward the outside or from the outside toward the inside of the information recording medium.

4. A method according to claim 1, wherein
the information recording medium is made of a phase change material.

5. A method according to claim 1, wherein
the information recording medium is made of a magneto-optical material.

6. A method according to claim 5, wherein
the information recording medium is a medium adapted for domain wall displacement reproduction.

7. An apparatus for recording a series of information on an information recording medium having a recording region comprising information tracks including a land section and a groove section, the land section and the groove section being arranged alternately, said apparatus comprising:

an optical head for irradiating a light spot on the information tracks in order to record the information on the information recording medium; and a control circuit for controlling the information recording operation so as to record the information on the land section and subsequently on the groove section over the whole recording region, or where the recording region is divided into a plurality of zones, over each zone.

* * * * *